United States Patent
Kroeller et al.

(10) Patent No.: US 9,869,561 B2
(45) Date of Patent: Jan. 16, 2018

(54) METHOD AND APPARATUS FOR PROVIDING TRAFFIC EVENT NOTIFICATIONS

(71) Applicant: HERE Global B.V., Veldhoven (NL)

(72) Inventors: Alexander Kroeller, Veldhoven (NL); Olivier Dousse, Berlin (DE)

(73) Assignee: HERE Global B.V., Veldhoven (NL)

( * ) Notice: Subject to any disclaimer, the term of this patent is extended or adjusted under 35 U.S.C. 154(b) by 44 days.

(21) Appl. No.: 14/949,368

(22) Filed: Nov. 23, 2015

(65) Prior Publication Data

US 2017/0146353 A1 May 25, 2017

(51) Int. Cl.
*G06F 19/00* (2011.01)
*G01C 21/34* (2006.01)
(Continued)

(52) U.S. Cl.
CPC ..... *G01C 21/3415* (2013.01); *G01C 21/3492* (2013.01); *G01C 21/3691* (2013.01); *G08G 1/012* (2013.01); *G08G 1/0112* (2013.01); *G08G 1/0129* (2013.01); *G08G 1/0145* (2013.01); *G08G 1/0969* (2013.01); *G08G 1/096716* (2013.01); *G08G 1/096741* (2013.01); *G08G 1/096775* (2013.01); *G08G 1/096811* (2013.01); *G08G 1/096844* (2013.01); *G01C 21/36* (2013.01); *H04W 4/046* (2013.01)

(58) Field of Classification Search
CPC ............ G01C 21/3415; G01C 21/3492; G01C 21/3691
USPC .......................................... 701/117, 400, 414
See application file for complete search history.

(56) References Cited

U.S. PATENT DOCUMENTS 7,440,843 B2 10/2008 Yoshikawa et al.
8,332,132 B2 12/2012 Groenhuijzen et al.
(Continued)

FOREIGN PATENT DOCUMENTS

EP 2 136 184 A2 12/2009

OTHER PUBLICATIONS

Wise, "INRIX—Stay One Step Ahead of Traffic Jams", Web Page, Jul. 9, 2013, 6 Pages.
(Continued)

*Primary Examiner* — Ronnie Mancho
(74) *Attorney, Agent, or Firm* — Ditthavong & Steiner, P.C.

(57) ABSTRACT

An approach is provided for determining an escape point for at least one predicted route, and causing a timely notification based on attributes associated with the escape point. The approach involves determining at least one predicted route for at least one vehicle. The approach also involves determining one or more traffic events associated with the at least one predicted route. The approach further involves determining at least one escape point for the one or more traffic events, wherein the at least one escape point represents at least one location at which the one or more traffic events can be avoided via at least one detour route. The approach also involves causing, at least in part, a presentation of one or more notifications related to the at least one escape point, the one or more traffic events, or a combination thereof based, at least in part, on characteristic information, availability information, or a combination thereof associated with the at least one escape point.

20 Claims, 11 Drawing Sheets

(51) Int. Cl.
*G01C 21/36* (2006.01)
*G08G 1/01* (2006.01)
*G08G 1/0967* (2006.01)
*G08G 1/0968* (2006.01)
*G08G 1/0969* (2006.01)
*H04W 4/04* (2009.01)

(56) References Cited

U.S. PATENT DOCUMENTS

| | | | |
|---|---|---|---|
| 8,781,716 B1 | 7/2014 | Wenneman et al. | |
| 8,954,278 B2 * | 2/2015 | Tennent | G01C 21/32 701/532 |
| 9,014,977 B2 * | 4/2015 | Beaurepaire | G01C 21/34 340/988 |
| 9,045,041 B2 * | 6/2015 | Dorum | G01C 21/32 |
| 9,046,376 B2 * | 6/2015 | Tuukkanen | G01C 21/3492 |
| 9,057,622 B2 * | 6/2015 | Pfeifle | G08G 1/09626 |
| 9,109,914 B2 * | 8/2015 | Arcot | G01C 21/3492 |
| 9,558,657 B2 * | 1/2017 | Fowe | G01C 21/3492 |
| 2004/0204846 A1 | 10/2004 | Yano et al. | |
| 2007/0208492 A1 | 9/2007 | Downs et al. | |
| 2009/0048767 A1 | 2/2009 | Vaughn | |
| 2011/0153742 A1 | 6/2011 | Sloop et al. | |
| 2013/0162449 A1 | 6/2013 | Ginsberg | |
| 2013/0166096 A1 | 6/2013 | Jotanovic | |
| 2014/0279723 A1 | 9/2014 | McGavran et al. | |

OTHER PUBLICATIONS

Office Action for corresponding European Patent Application No. 16199876.0-1803, dated Sep. 28, 2017, 11 pages.

* cited by examiner

METHOD AND APPARATUS FOR PROVIDING TRAFFIC EVENT NOTIFICATIONS

BACKGROUND

It is demanding for a navigation system to determine relevant traffic information if destination information has not been provided by a user. At present, the navigation system provides predicted traffic information at the beginning of a travel, hence it does not incorporate the changing traffic conditions during the travel. Further, the navigation system does not hide irrelevant traffic information (e.g., traffic events that are unavoidable, traffic events in wrong routes, etc.) thereby resulting in information overload for the users. As a result, service providers face significant technical challenges in calculating location points to avoid relevant traffic events, and alerting users precisely before the traffic event location.

SOME EXAMPLE EMBODIMENTS

Therefore, there is a need for an approach for determining escape points for one or more predicted routes, and causing a timely notification in the at least one device based on attributes associated with the escape points.

According to one embodiment, a method comprises determining at least one predicted route for at least one vehicle. The method also comprises determining one or more traffic events associated with the at least one predicted route. The method further comprises determining at least one escape point for the one or more traffic events, wherein the at least one escape point represents at least one location at which the one or more traffic events can be avoided via at least one detour route. The method also comprises causing, at least in part, a presentation of one or more notifications related to the at least one escape point, the one or more traffic events, or a combination thereof based, at least in part, on characteristic information, availability information, or a combination thereof associated with the at least one escape point.

According to another embodiment, an apparatus comprises at least one processor, and at least one memory including computer program code for one or more computer programs, the at least one memory and the computer program code configured to, with the at least one processor, cause, at least in part, the apparatus to determine at least one predicted route for at least one vehicle. The apparatus is also caused to determine one or more traffic events associated with the at least one predicted route. The apparatus is further caused to determine at least one escape point for the one or more traffic events, wherein the at least one escape point represents at least one location at which the one or more traffic events can be avoided via at least one detour route. The apparatus is also caused to cause, at least in part, a presentation of one or more notifications related to the at least one escape point, the one or more traffic events, or a combination thereof based, at least in part, on characteristic information, availability information, or a combination thereof associated with the at least one escape point.

According to another embodiment, a computer-readable storage medium carries one or more sequences of one or more instructions which, when executed by one or more processors, cause, at least in part, an apparatus to determine at least one predicted route for at least one vehicle. The apparatus is also caused to determine one or more traffic events associated with the at least one predicted route. The apparatus is further caused to determine at least one escape point for the one or more traffic events, wherein the at least one escape point represents at least one location at which the one or more traffic events can be avoided via at least one detour route. The apparatus is also caused to cause, at least in part, a presentation of one or more notifications related to the at least one escape point, the one or more traffic events, or a combination thereof based, at least in part, on characteristic information, availability information, or a combination thereof associated with the at least one escape point.

According to another embodiment, an apparatus comprises means for determining at least one predicted route for at least one vehicle. The apparatus also comprises means for determining one or more traffic events associated with the at least one predicted route. The apparatus further comprises means for determining at least one escape point for the one or more traffic events, wherein the at least one escape point represents at least one location at which the one or more traffic events can be avoided via at least one detour route. The apparatus also comprises means for causing, at least in part, a presentation of one or more notifications related to the at least one escape point, the one or more traffic events, or a combination thereof based, at least in part, on characteristic information, availability information, or a combination thereof associated with the at least one escape point.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining escape points for one or more predicted routes, and causing a timely notification in the at least one device based on attributes associated with the escape points are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to determining escape points from predicted routes and causing timely notification of the escape points, it is contemplated that the approach described herein may be applicable to any invention that can be modelled according the example processes described below.

Figure 1A:
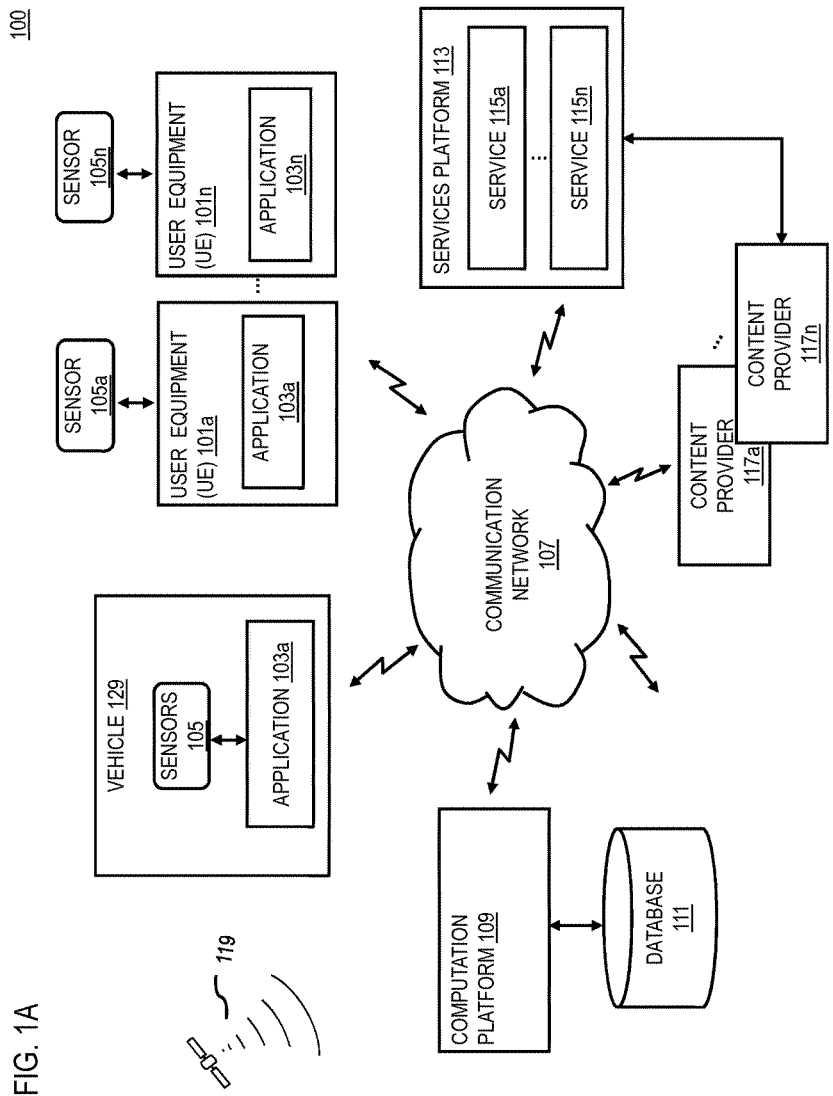
FIG. 1A is a diagram of a system capable of determining escape points for one or more predicted routes, and causing a timely notification in the at least one device based on attributes associated with the escape points, according to one example embodiment.

FIG. 1A is a diagram of a system capable of determining escape points for one or more predicted routes, and causing a timely notification in the at least one device based on attributes associated with the escape points, according to one embodiment. In one scenario, current navigation system optimizes route calculations and time of arrival estimation by providing traffic information in real-time. However, when the navigation system is in assistance mode (i.e., when a destination has not been entered by the user) and the user has knowledge of the direction towards a particular destination, the current navigation system have difficulty in determining the amount of traffic information to display, and the time to display it. In one example embodiment, the current navigation system (e.g., a traffic enabled routing system) requires accurate destination information to compute the fastest route, and needs user confirmation for destination prediction. Further, a user who knows the area well may only require notification on traffic information to make an informed decision, a full guidance may be too directive and/or invasive. In another example embodiment, the current navigation system may predict a destination and multiple routes towards the destination, and may display traffic events affecting the predicted route(s). However, the entire traffic events are provided at the beginning of the travel, and this is information overload for the users. Further, traffic situation may change during travel (i.e., between the start time and the time of arrival at the destination), therefore corrections and updates of the traffic information is needed. Additionally, a lot of irrelevant traffic events (e.g. events along the wrong route, events that are expected, events that are unavoidable) are displayed, such irrelevant traffic information needs to be removed.

To address this problem, a system 100 of FIG. 1A introduces the capability to determine escape points for one or more predicted routes, and cause a timely notification in the at least one device based on attributes associated with the escape points. In one scenario, the system 100 predicts at least one possible route(s) for at least one user (e.g., commuter/driver) at the starts of a journey. The system 100 may download and compare traffic information for the predicted route(s) to the average traffic condition encountered in the past on each segment of the route(s). Then, the system 100 may extract one or more route segments with significant discrepancies (i.e., either more severe or less severe than average traffic) and may compute escape points for the one or more extracted route segments. Subsequently, the system 100 may notify one or more users on the traffic information regarding each extracted segment as the user approaches its corresponding escape point. In one scenario, the system 100 notifies at least one user about the relevant traffic event (e.g., unusual traffic events, traffic congestion, etc.) just before the traffic event location. In one embodiment, the system 100 may update traffic event information in real-time when discrepancy at any segment of the downloaded route changes. In another embodiment, the system 100 may repeat the whole process (e.g., starting from downloading the routes) if any update occurs. In one example embodiment, user C may be provided with relevant and timely traffic information during his/her routine trips (e.g. commute) even if the navigation system is not in a guidance mode but is in a simple assistance mode. The system 100 only shows unusual traffic events at the time they are required to make a route decision, not before. Showing events as late as possible reduces the information overload at the start, and ensures the best information freshness.

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a computation platform 109 via a communication network 107, e.g., a wireless communication network. In one embodiment, the computation platform 109 performs one or more functions associated with determining escape points for one or more predicted routes, and causing a timely notification in the at least one device based on attributes associated with the escape points.

As shown in FIG. 1A, the system 100 comprises of UE 101. In one embodiment, the UE 101 may include, but is not restricted to, any type of a mobile terminal, wireless terminal, fixed terminal, or portable terminal. Examples of the UE 101, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In one embodiment, the UE 101 may support any type of interface for supporting the presentment of one or more recommended routes towards at least one destination. In addition, the UE 101 may facilitate various input means for receiving and generating information, including, but not restricted to, a touch screen capability, a keyboard and keypad data entry, a voice-based input mechanism, and the like. Any known and future implementations of the UE 101 may also be applicable. In one embodiment, the UE 101 may be included, embedded within, or communicatively connected to the one or more vehicles (e.g., vehicle 129). In one embodiment, the at least one or more vehicles 129 includes at least one autonomous vehicle, at least one highly-assisted driving vehicle, or a combination thereof.

The UE 101 may further include applications 103. Further, the applications 103 may include various applications such as, but not restricted to, location-based service application, navigation application, content provisioning application, camera/imaging application, media player application, social networking application, calendar applications, multimedia application, and the like. In one embodiment, the applications 103 are installed within the UE 101. In one example embodiment, a location-based service application installed in the UE 101 enables the computation platform 109 to determine, for example, position, destination, heading, speed, context, identification, type, or any combination thereof, for one or more of the UE 101, such as vehicles. In another embodiment, the application 103 enables the computation platform 109 to process location information and/or traffic information and/or sensor information to determine at least one predicted route and/or at least one escape point for the at least one predicted route.

The system 100 also includes one or more sensors 105, which can be implemented, embedded or connected to the UE 101 and/or vehicle 129. The sensors 105 may be any type of sensor. In certain embodiments, the sensors 105 may include, for example, but not restricted to, a global positioning sensor for gathering location data, such as a Global Navigation Satellite System (GNSS) sensor, Light Detection And Ranging (LIDAR) for gathering distance data, a network detection sensor for detecting wireless signals or receivers for different short-range communications (e.g., Bluetooth, Wi-Fi, Li-Fi, Near Field Communication (NFC) etc.), temporal information sensors, a camera/imaging sensor for gathering image data (e.g., the camera sensors may automatically capture traffic flow information and/or traffic light information for analysis purpose), and the like. In another embodiment, the sensors 105 may include light sensors, oriental sensors augmented with height sensor and acceleration sensor (e.g., an accelerometer can measure acceleration and can be used to determine orientation of the UE 101), tilt sensors, e.g., gyroscopes, to detect the degree of incline or decline of the vehicle along a path of travel, an electronic compass to detect a compass direction, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors 105 may detect weather data, road condition, traffic information, or a combination thereof. In one example embodiment, the UE 101 may include Global Positioning System (GPS) receivers to obtain geographic coordinates from satellites 119 for determining current location and time associated with the UE 101. Further, the location can be determined by an Assisted Global Positioning (A-GPS), Cell of Origin, a wireless signal triangulation system, or other location extrapolation technologies. In another example embodiment, the one or more sensors may provide in-vehicle navigation services, wherein one or more location based services may be provided to the at least one UE 101 associated with the at least one user of the vehicle and/or at least one other UE 101 associated with the at least one vehicle. In one example embodiment, the one or more sensors 105 in the UE 101 or vehicle 129 enable determination, for example, position, destination, speed, type and identification, or any combination thereof, for the UE 101 or vehicle 129. In another embodiment, the one or more sensors 105 enable determination the status situation in one or more road segments, such as traffic or weather.

Further, various elements of the system 100 may communicate with each other through a communication network 107. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), vehicle controller area network (CAN bus), and the like, or any combination thereof.

In one embodiment, the computation platform 109 may be a platform with multiple interconnected components. The computation platform 109 may include one or more servers, intelligent networking devices, computing devices, components and corresponding software for determining escape points for one or more predicted routes, and causing a timely notification in the at least one device based on attributes associated with the escape points. In addition, it is noted that the computation platform 109 may be a separate entity of the system 100, a part of the one or more services 115a-115n (collectively referred to as services 115) of the services platform 113, or the UE 101.

In one embodiment, the computation platform 109 may process travel patterns, activity information, or a combination thereof associated with at least one device, at least one device associated with at least one vehicle, or a combination thereof to create at least one predictor model. Then, the computation platform 109 may cause a prediction of one or more routes for the at least one device, the at least one device associated with the at least one vehicle, or a combination thereof using, at least in part, the at least one predictor model. In another embodiment, the computation platform 109 may determine at least one escape point based, at least in part, on traffic information associated with at least one of the one or more predicted routes. Then, the computation platform 109 may cause a notification of the at least one escape point in the at least one device, the at least one device associated with the at least one vehicle, or a combination thereof at at least one specific time period. In one scenario, a specific time period includes delaying, expediting, or a combination thereof of the notification based, at least in part, on the traffic information, location information, user actions, or a combination thereof.

In one embodiment, the computation platform 109 may update the one or more predicted routes based, at least in part, on a determination that the at least one device, the at least one device associated with the at least one vehicle, or a combination thereof deviates from the one or more predicted routes. The one or more routes not followed by the at least one user of the at least one device may be removed. In another embodiment, the computation platform 109 may process historical data associated with the one or more predicted routes to determine the traffic information. Then, the computation platform 109 may cause a concealing of the traffic information based, at least in part, on a determination that at least one user of the at least one device cannot avoid the traffic condition at a reasonable cost.

In one embodiment, the computation platform 109 may cause a comparison of current traffic information, predicted traffic information, or a combination thereof with average traffic information associated with the one or more predicted routes. Then, the computation platform 109 may cause an extraction of at least one noticeable route segment from the one or more predicted routes with severe traffic information, less severe traffic information, or a combination thereof than the average traffic information. In another embodiment, the computation platform 109 may calculate at least one escape point for the at least one noticeable route segment. Then, the computation platform 109 may cause a presentation of the traffic information for the at least one noticeable route segment as the at least one device, the at least one device associated with at least one vehicle, or a combination thereof approaches at least one corresponding escape point.

In one embodiment, the computation platform 109 may determine probability values for the one or more routes at at least one starting point. Then, the computation platform 109 may update the probability values based, at least in part, on movement of the at least one user of the at least one device.

In one embodiment, the computation platform 109 may compare the average speed to a traffic speed for the one or more road segments. The traffic speed for the one or more road segments is determined in real-time at the at least one starting point of the one or more road segments, predicted at subsequent part of the one or more road segments, or a combination thereof. In another embodiment, the computation platform 109 may apply at least one threshold to determine relative difference between the average speed and the traffic speed. The at least one road segment is declared noticeable if the traffic speed is lower or higher than the average speed.

In one embodiment, the computation platform 109 may apply one or more thresholds to determine routes most likely to be travelled by the at least one user of the at least one device, traffic events relevant to the one or more predicted routes, or a combination thereof.

In one embodiment, the geographic database 111 may store one or more routes travelled by the at least one user of the at least one device, an average speed for one or more road segments associated with the one or more routes, or a combination thereof. In another embodiment, the geographic database 111 may store and manage traffic data for one or more predicted routes. The information may be any multiple types of information that can provide means for aiding in the content provisioning and sharing process.

The services platform 113 may include any type of service. By way of example, the services platform 113 may include mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, etc. In one embodiment, the services platform 113 may interact with the UE 101, the computation platform 109 and the content provider 117 to supplement or aid in the processing of the content information. In one embodiment, the services platform 113 may be implemented or embedded in the computation platform 109 or in its functions.

By way of example, the services 115 may be an online service that reflects interests and/or activities of users. The services 115 allow users to share contact information, location information, activities information, contextual information, historical user information and interests within their individual networks, and provides for data portability. The services 115 may additionally assist in providing the computation platform 109 with information on travel plans of at least one user, activity information of at least one user, user profile information, and a variety of additional information.

The content providers 117a-117n (collectively referred to as content provider 117) may provide content to the UE 101, the vehicle 129, the computation platform 109, and the services 115 of the services platform 113. The content provided may be any type of content, such as, image content, textual content, audio content (e.g., audio notification), video content (e.g., visual notification), etc. In one embodiment, the content provider 117 may provide content that may supplement content of the applications 103, the sensors 105, or a combination thereof. In one embodiment, the content provider 117 may provide or supplement the mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, local map data, or any combination thereof. By way of example, the content provider 117 may provide content that may aid in determining traffic events and/or escape points for at least one predicted route in real-time. In one embodiment, the content provider 117 may also store content associated with the UE 101, the computation platform 109, and the services 115 of the services platform 113. In another embodiment, the content provider 117 may manage access to a central repository of data, and offer a consistent, standard interface to data, such as, a repository of location information and/or traffic information for one or more routes, and so on. Any known or still developing methods, techniques or processes for determining at least one escape point and/or traffic events for at least one predicted route may be employed by the computation platform 109.

By way of example, the UE 101, the computation platform 109 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
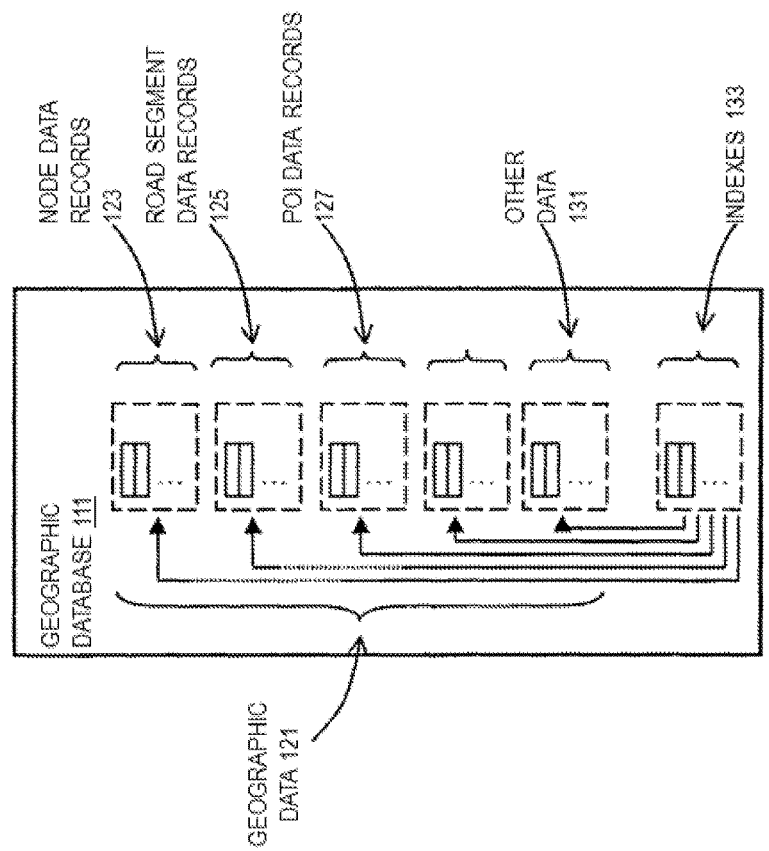
FIG. 1B is a diagram of the geographic database 111 of system 100, according to exemplary embodiments.

FIG. 1B is a diagram of the geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, and other data records 131, for example. More, fewer or different data records can be provided. In one embodiment, the other data records 131 include cartographic ("carto") data records, routing data, traffic signal data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, traffic lights, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data records 127 or can be associated with POIs or POI data records 127 (such as a data point used for displaying or representing a position of a city). In addition, the geographic database 111 can include data from radio advertisements associated with the POI data records 127. By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., schedules for traffic light signals). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions, for example, traffic map display with escape points for avoiding travelling in a route segment with heavy traffic density.

Figure 2:
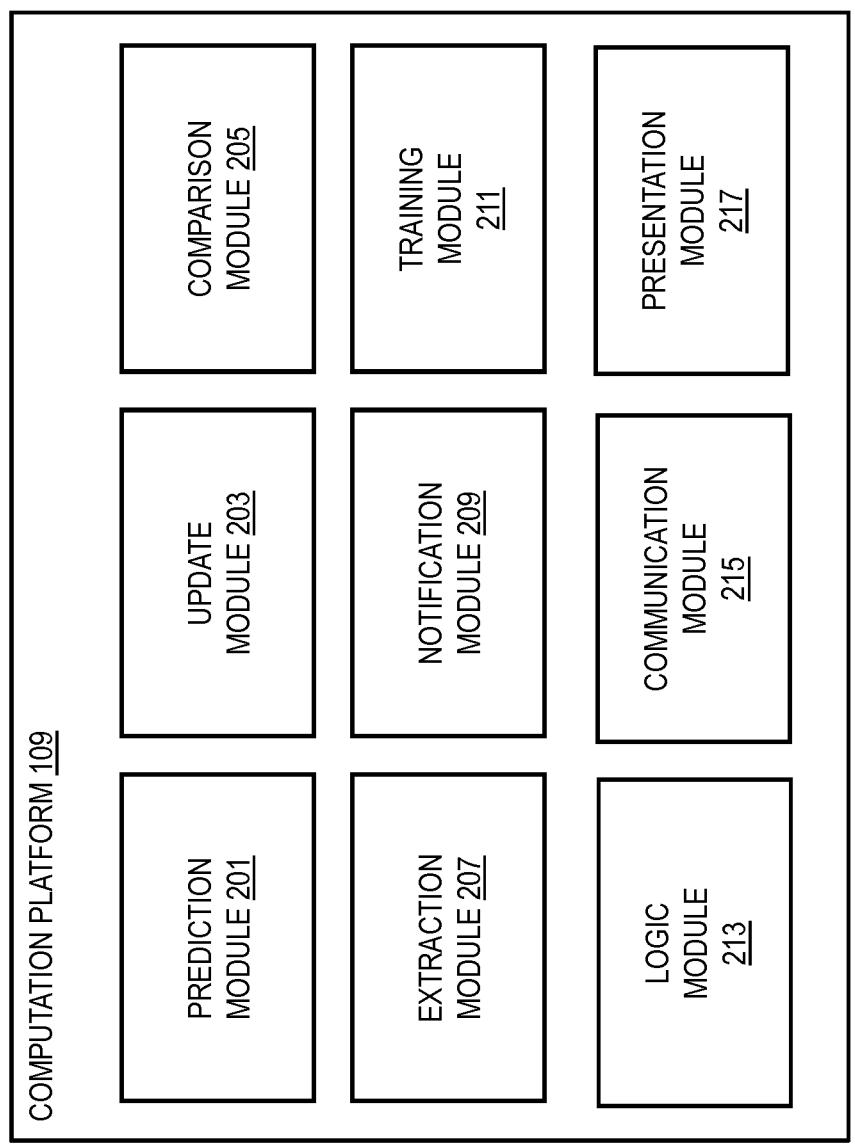
FIG. 2 is a diagram of the components of the computation platform 109, according to one example embodiment.

FIG. 2 is a diagram of the components of the computation platform 109, according to one example embodiment. By way of example, the computation platform 109 may include one or more components for determining escape points for one or more predicted routes, and causing a timely notification in the at least one device based on attributes associated with the escape points. In one embodiment, the computation platform 109 may include prediction modules 201, update modules 203, comparison modules 205, extraction modules 207, notification modules 209, training modules 211, logic modules 213, communication modules 215, and presentation modules 217. It is contemplated that the functions of these components may be combined in one or more components or performed by other components with similar functionalities.

In one embodiment, the prediction module 201 may process travel patterns, activity information, or a combination thereof associated with at least one device to predict one or more routes. In another embodiment, the prediction module 201 may determine traffic information (e.g., event information) for one or more routes in real-time. Then, the prediction module 201 may predict at least one route based, at least in part, on the traffic information. In one example embodiment, the prediction module 201 may determine a concert event at location XYZ, whereupon the prediction module 201 may predict at least one route towards location XYZ.

In one embodiment, the update module 203 may determine that at least one device and/or at least one device associated with the at least one vehicle have deviated from the one or more predicted routes. In one example embodiment, the update module 203 may remove one or more routes not followed by the at least one user of the at least one device. Then, the update module 203 may update the one or more predicted routes. In another embodiment, the update module 203 may determine probability values for one or more routes based, at least in part, on the movement of the at least one user of the at least one device within the one or more routes. In one example embodiment, the prediction module 201 may use the one or more updated predicted routes and/or probability scores for use in the determination of the one or more routes.

In one embodiment, the comparison module 205 may compare current traffic information, predicted traffic information, or a combination thereof with the average traffic information associated with the one or more predicted routes. In one example embodiment, the comparison module 205 may compare the average speed to a traffic speed for the one or more road segments. The traffic speed for the one or more road segments may be determined in real-time at the at least one starting point of the one or more road segments, or predicted at subsequent part of the one or more road segments.

In one embodiment, the extraction module 207 may extract at least one noticeable route segment from the one or more predicted routes. In one scenario, the at least one noticeable route segment includes route segment with severe traffic information and/or less severe traffic information as compared to an average traffic information. In another scenario, the at least one noticeable route segment includes higher traffic speed and/or lower traffic speed when compared to the average traffic speed in the one or more routes.

In one embodiment, the notification module 209 may cause a notification of at least one escape point in the at least one device, the at least one device associated with the at least one vehicle, or a combination thereof at at least one specific time period. In one scenario, the at least one specific time period includes delaying, expediting, or a combination thereof of the notification based, at least in part, on the traffic information, location information, user actions, or a combination thereof.

In one embodiment, the training module 211 may cause training for determining and/or notifying one or more escape points for one or more predicted routes. In one embodiment, travel patterns and/or user activities associated with one or more devices may be utilized to generate a database which may be utilized to train one or more prediction model/algorithms. In another embodiment, traffic information associated with one or more predicted routes may be utilized to generate a database which may be utilized to train one or more computation models/algorithms.

In one embodiment, the logic module 213 may manage tasks, including tasks performed by the other modules. For example, although the other modules may perform their actual tasks, the logic module 213 may determine when and how those tasks are performed or otherwise direct the other modules to perform the task. In one embodiment, the logic module 213 may determine traffic information for one or more predicted routes in real-time, batch mode, according to a schedule, or a combination thereof. By way of example, the traffic information may include traffic speed information, traffic density information, escape points, etc.

The communication module 215 may be used for communication between various elements of the system 100 as well as between modules, elements, components, etc. of the computation platform 109. For example, the communication module 215 may be used to communicate commands, requests, data, etc., to/from the computation platform 109, database 111, the content provider 117, or the like.

In one embodiment, the presentation module 217 obtains information and/or updates from the other modules. Then, the presentation module 217 continues with generating a presentation of at least one notification related to at least one escape point and/or one or more traffic events for at least one predicted route. In one scenario, numerous inputs may be applicable including network data, sensor inputs, personal preferences, real-time data and other like inputs. In one example embodiment, the presentation module 217 may cause a presentation wherein at least one escape point, at least one congested route, at least one detour route, or a combination thereof may be highlighted. The presentation may also incorporate temporal information (e.g., estimated time of arrival), traffic density information (e.g., number of vehicles nearby), etc.

The above presented modules and components of the computation platform 109 can be implemented in hardware, firmware, software, or a combination thereof. Though depicted as a separate entity in FIG. 1A, it is contemplated that the computation platform 109 may be implemented for direct operation by respective UE 101. As such, the computation platform 109 may generate direct signal inputs by way of the operating system of the UE 101 for interacting with the applications 103. In another embodiment, one or more of the modules 201-217 may be implemented for operation by respective UEs, as the computation platform 109, or combination thereof. Still further, the computation platform 109 may be integrated for direct operation with the services 115, such as in the form of a widget or applet, in accordance with an information and/or subscriber sharing arrangement. The various executions presented herein contemplate any and all arrangements and models.

Figure 3:
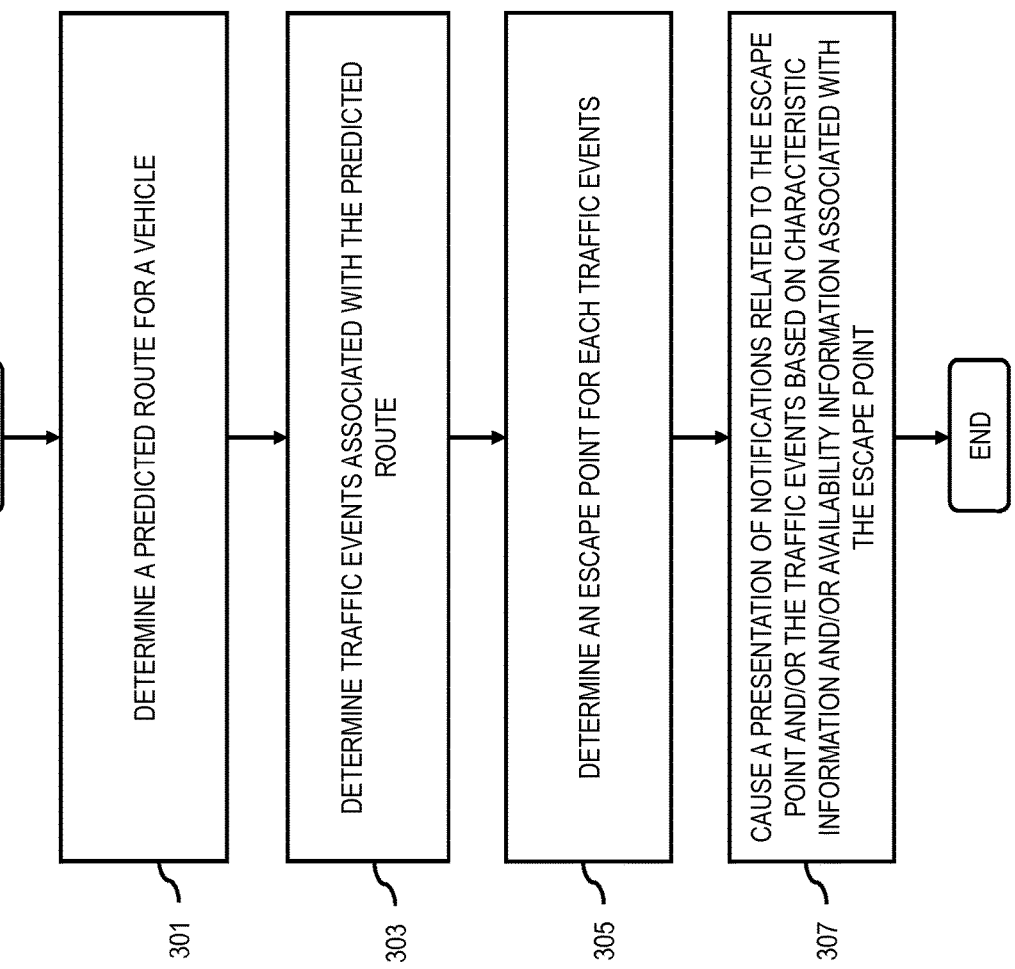
FIG. 3 is a flowchart of a process for determining escape points for one or more predicted routes, and causing a timely notification in the at least one device based on attributes associated with the escape points, according to one example embodiment.
Figure 9:
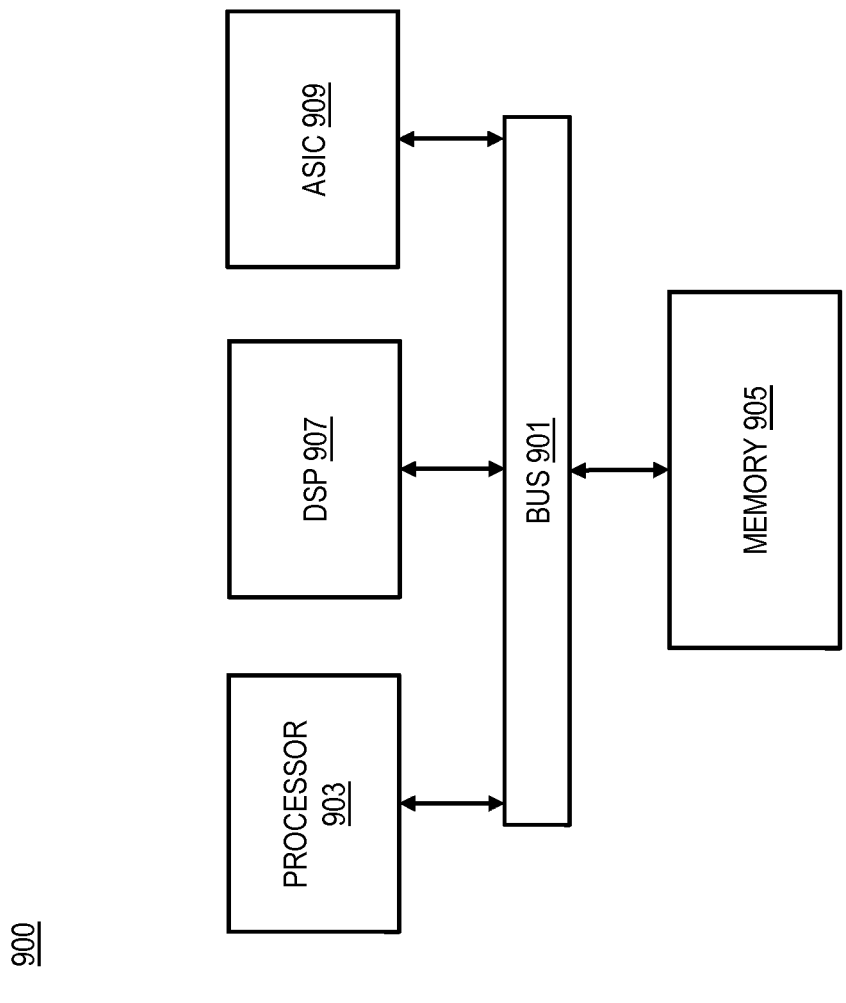
FIG. 9 is a diagram of a chip set that can be used to implement an embodiment of the invention.

FIG. 3 is a flowchart of a process for determining escape points for one or more predicted routes, and causing a timely notification in the at least one device based on attributes associated with the escape points, according to one example embodiment. In one embodiment, the computation platform 109 performs the process 300 and is implemented in, for instance, a chip set including a processor and a memory as shown in FIG. 9.

In step 301, the computation platform 109 may determine at least one predicted route for at least one vehicle. In one scenario, the computation platform 109 may record all routes travelled in the past by at least one user, and may build a probabilistic model of which route is taken when. In one example embodiment, when a user starts a journey, the computation platform 109 may predict one or more routes that the user will follow. Then, the computation platform 109 may download traffic information for the one or more predicted routes. Needless to mention, information is partially predicted, as the driver takes time to reach the latter parts of the route. In one embodiment, at least one predicted route is determined or updated based, at least in part, on at least one predictive model as the at least one vehicle travels at least one road network. In one scenario, the computation platform 109 may update at least one predicted route after each intersection based, at least in part, on the route chosen by the at least one user. Then, the computation platform 109 may repeat the steps of downloading traffic information, comparing current or predicted traffic information, and extracting noticeable route segments.

In step 303, the computation platform 109 may determine one or more traffic events associated with the at least one predicted route. In one example embodiment, the computation platform 109 may predict up to three likely routes using the route prediction algorithm, and may constantly update the prediction as the user drives through the routes. For example, if the user passes through one of the possible destination, the algorithm may determine that it is not the actual destination, and may reconfigure the escape points to next possible destinations. The computation platform 109 may use historical data associated with one or more predicted routes to identify unusual (e.g., either positive or negative) traffic conditions, if any.

In step 305, the computation platform 109 may determine at least one escape point for the one or more traffic events for all possible destination(s). In one embodiment, the at least one escape point represents at least one location at which the one or more traffic events can be avoided via at least one detour route. In one scenario, a reasonable detour is not available past the escape point, and there is no need to know about the traffic situation well ahead of the escape point. In another scenario, a reasonable detour means a detour that takes lesser or little more time to travel than the original route, given the present traffic conditions.

In step 307, the computation platform 109 may cause, at least in part, a presentation of one or more notifications related to the at least one escape point, the one or more traffic events, or a combination thereof based, at least in part, on characteristic information, availability information, or a combination thereof associated with the at least one escape point. In one scenario, the computation platform 109 may only present traffic events that affect the user's routing decisions. The computation platform 109 may cause a presentation of one or more notifications as late as possible, but early enough so that they can be used during the decision making process. In one scenario, decision points are located where two routes diverge. In another example embodiment, the computation platform 109 may present a notification of positive and/or negative deviations to ensure that a user is in the correct route segment. For example, the predicted route may contain a route segment that is usually congested. Today, this route segment is less congested than usual. Consequently, the computation platform 109 may present a notification to the user, so the user is encouraged to follow his usual route and is freed from thinking of alternative routes around the congested section.

Figure 4:
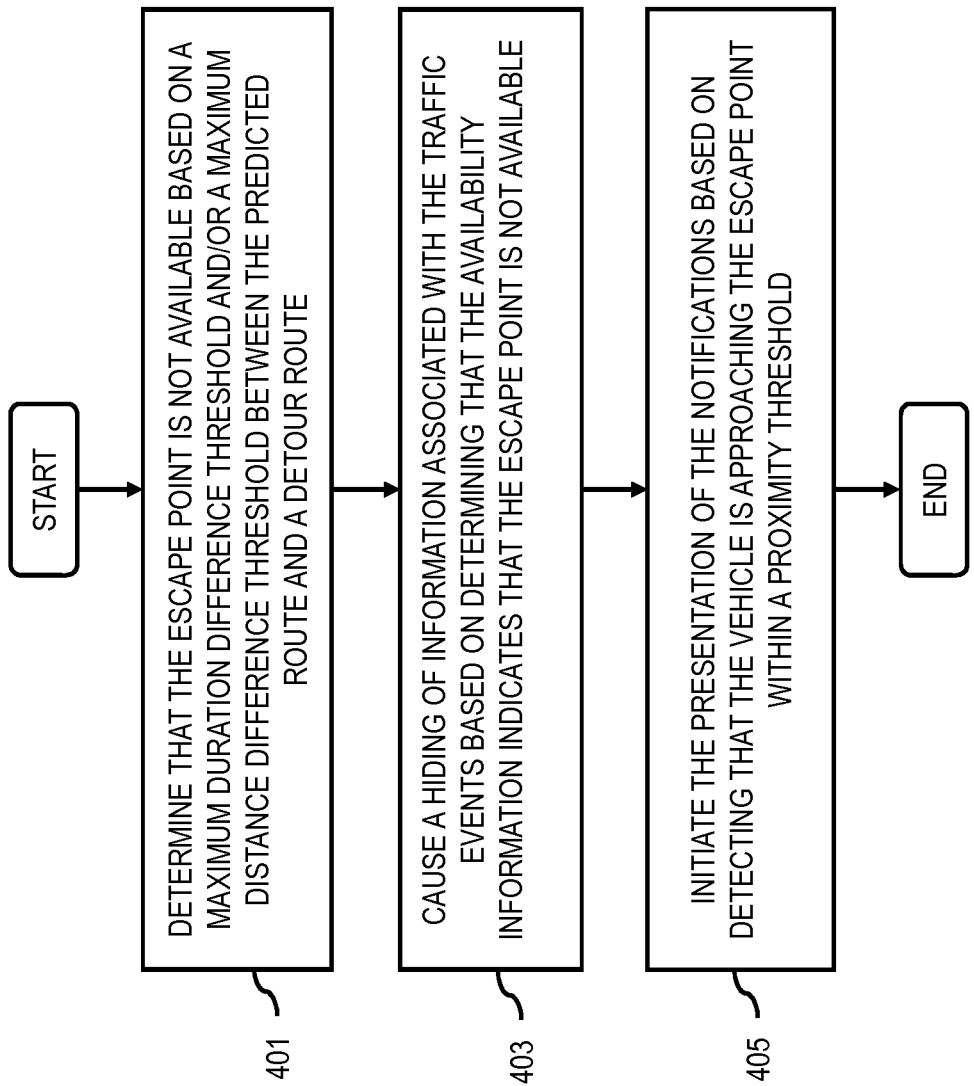
FIG. 4 is a flowchart of a process for hiding information associated with traffic events if the at least one escape point is not available, according to one example embodiment.

FIG. 4 is a flowchart of a process for hiding information associated with traffic events if the at least one escape point is not available, according to one example embodiment. In one embodiment, the computation platform 109 performs the process 400 and is implemented in, for instance, a chip set including a processor and a memory as shown in FIG. 9.

In step 401, the computation platform 109 may determine that the at least one escape point is not available based, at least in part, on at least one maximum duration difference threshold, at least one maximum distance difference threshold, or a combination thereof between the at least one predicted route and the at least one detour route. In one example embodiment, the predicted destination is the end of the predicted route. If several routes and/or destinations are likely, the computation platform 109 may calculate escape points for each likely routes and/or destinations. The escape point is the latest point of the predicted route from which the traffic event can be circumvented without a too large increase of travel time. The duration difference threshold and/or maximum distance difference threshold may be implemented to define "too large." In another example embodiment, the computation platform 109 may compute multiple routes (e.g., at least one route through the traffic event, at least one route avoiding the traffic event) from the beginning of the traffic event to be circumvented to the predicted destination. Then, the computation platform 109 may check whether the travel duration of the route avoiding the traffic event is much longer than the route through the traffic event. If it is much longer (e.g., if the travel duration using a detour route is more than X % and at least Y minutes longer), the computation platform 109 may move the start point of the two routes backwards (until the previous intersection) and iterate. The computation platform 109 may stop when the route avoiding the traffic event is not too much longer (and return the escape point) or when the start point coincides with the current location of the vehicle (in which case there is no escape point). In one scenario, X and Y are adjustable parameters, typical values may be 20% and 5 minutes.

In step 403, the computation platform 109 may cause, at least in part, a hiding of information associated with the one or more traffic events based, at least in part, on determining that the availability information indicates that the at least one escape point is not available. In one embodiment, the hiding of the information associated with the one or more traffic events is with respect to at least one mapping user interface, at least one navigation user interface, or a combination thereof. In one example embodiment, the computation platform 109 may determine that a reasonable detour is not available, and may hide traffic events that cannot be avoided at a reasonable cost. The computation platform 109 may never display traffic events information if escape points are unavailable nearby the traffic events.

In step 405, the computation platform 109 may initiate the presentation of the one or more notifications based, at least in part, on detecting that the at least one vehicle is approaching the at least one escape point within at least one proximity threshold. In one embodiment, the at least one proximity threshold specifies at least one latest point at which the one or more notifications can be used by at least one user to avoid the one or more traffic event. The computation platform 109 may present a notification right before the escape points, i.e., at the last possible moment where the information is still useful. This improves accuracy for route prediction along the trip. In addition, traffic information accuracy also improves with time, as the time difference between event showing and actual driving is smaller. This also means less contradicting updates about the same road segments.

Figure 5:
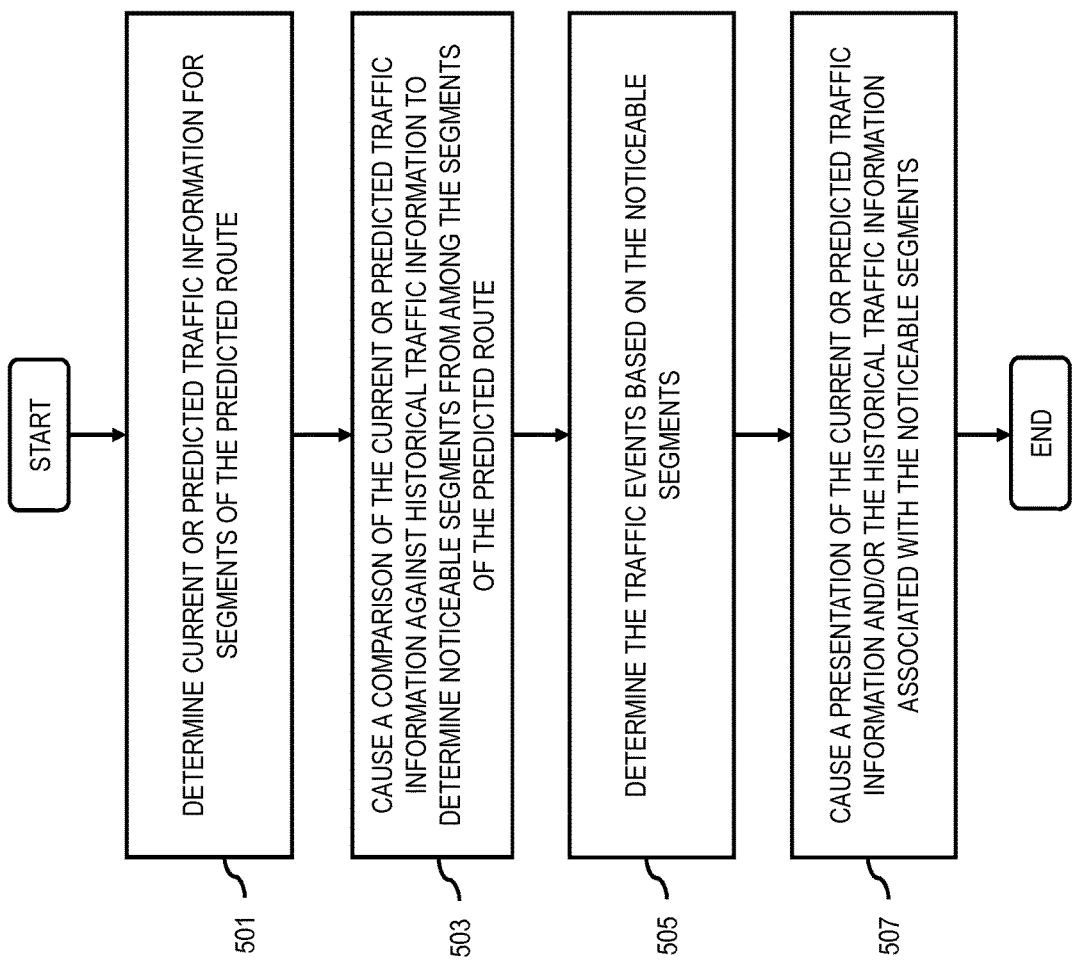
FIG. 5 is a flowchart of a process for comparing current or predicted traffic information with historical traffic information to determine noticeable segments, according to one example embodiment

FIG. 5 is a flowchart of a process for comparing current or predicted traffic information with historical traffic information to determine noticeable segments, according to one example embodiment. In one embodiment, the computation platform 109 performs the process 500 and is implemented in, for instance, a chip set including a processor and a memory as shown in FIG. 9.

In step 501, the computation platform 109 may determine current or predicted traffic information for one or more segments of the at least one predicted route. This process avoids showing of traffic conditions that is common to a user, for example, the commute route for a user may be congested every morning, as a result reporting this traffic condition repeatedly is not a solution and does not bring any value. As a result, determining current or predicted traffic information enables reporting positive events, for example, a road segment under construction for several months is free today. In one scenario, the predicted traffic information may be used to assess the completion of the road construction and a suitable traffic condition for users.

In step 503, the computation platform 109 may cause, at least in part, a comparison of the current or predicted traffic information against historical traffic information to determine one or more noticeable segments from among the one or more segments of the at least one predicted route. In one embodiment, the comparison of the current or predicted traffic information against historical traffic information is based, at least in part, on at least one difference threshold value. In one example embodiment, the computation platform 109 may record the average speed for one or more route segments of the at least one predicted route. Then, the computation platform 109 may compare the average speed on each route segment to the traffic speed reported by the traffic service. The computation platform 109 may employ a threshold to the relative difference between the two speeds. If the reported traffic speed is much lower or much higher than the average speed, the route segment is declared noticeable. The traffic speed is either real-time (for the beginning of the road) or predicted (for the later part of the road). Then, the computation platform 109 may extract noticeable route segments with significant discrepancies (i.e., route segments with either more severe or less severe condition than average traffic). In one scenario, the computation platform 109 may provide probability values for one or more routes at the starting point of a journey. As the vehicle moves, the set of routes and probabilities are updated. In particular, route that have not been followed are removed from the set. In another scenario, the computation platform 109 may implement a threshold to keep the most likely routes and/or fetch traffic events relevant to these routes. In such manner, the computation platform 109 may only display traffic events that deviate significantly from average traffic situation thereby reducing information overload and increasing pertinence.

In step 505, the computation platform 109 may determine the one or more traffic events based, at least in part, on the one or more noticeable segments. In one embodiment, the computation platform 109 may determine escape points for each noticeable segment. Then, the computation platform 109 may display traffic events for each noticeable segment when the user approaches at least one corresponding escape point.

In step 507, the computation platform 109 may cause, at least in part, a presentation of the current or predicted traffic information, the historical traffic information, or a combination thereof associated with the one or more noticeable segments.

Figure 6:
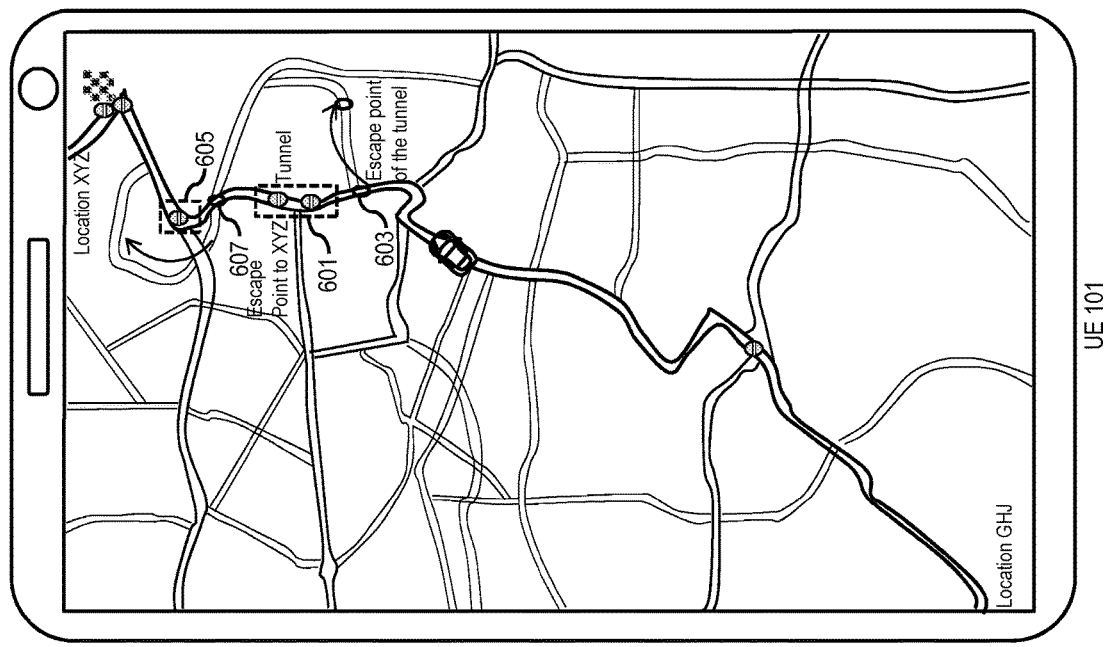
FIG. 6 is a user interface diagram utilized in the process of calculating one or more escape points and notifying users regarding at least one escape point based on traffic condition at a specific time period, according to one example embodiment.

FIG. 6 is a user interface diagram utilized in the process of calculating one or more escape points and notifying users regarding at least one escape point based on traffic condition at a specific time period, according to one example embodiment. In one example embodiment, user A is travelling from location GHJ to location XYZ. The computation platform 109 may retrieve information on traffic conditions for the one or more routes towards location XYZ from at least one traffic database maintained by respective geographic authorities. Then, the computation platform 109 may identify at least one noticeable route segment 601 (i.e., route segment with severe or less severe traffic condition than the average traffic condition). The computation platform 109 may predict bad traffic conditions (e.g., road construction, traffic congestion, etc.) in the noticeable route segment 601. In one scenario, noticeable route segment 601 may be a tunnel. The computation platform 109 may calculate at least one escape point 603 to avoid the bad traffic condition in the noticeable route segment 601. Then, the computation platform 109 may cause a presentation of the traffic information as user A approaches the at least one escape point 603. In another scenario, traffic condition in the noticeable route segment 601 may improve, as a result, the computation platform 109 may not cause any notification regarding the escape point 603 while the user smoothly drives through the noticeable route segment 601. On the other hand, the computation platform 109 may determine heavy traffic congestion ahead of noticeable route segment 601. Then, the computation platform 109 may update the route prediction, and get updated prediction on traffic information to identify one or more noticeable route segments (e.g., route segment 601 is no longer a noticeable route segment, but route segment 605 is). Subsequently, the computation platform 109 may calculate escape point 607 to avoid the traffic congestion in route segment 605. The escape point 607 for the route segment 605 may be at the exit of the route segment 601. Then, the computation platform 109 may cause a notification of the traffic information in at least one UE 101 as the user approaches the escape point 607. In one scenario, a user may react to the notification either by taking the escape point 607 or by taking the other tunnel exit towards north. If the user takes the other exit towards north to reach his/her destination XYZ, the computation platform 109 may update the route prediction because the exit towards north is working.

Figure 7:
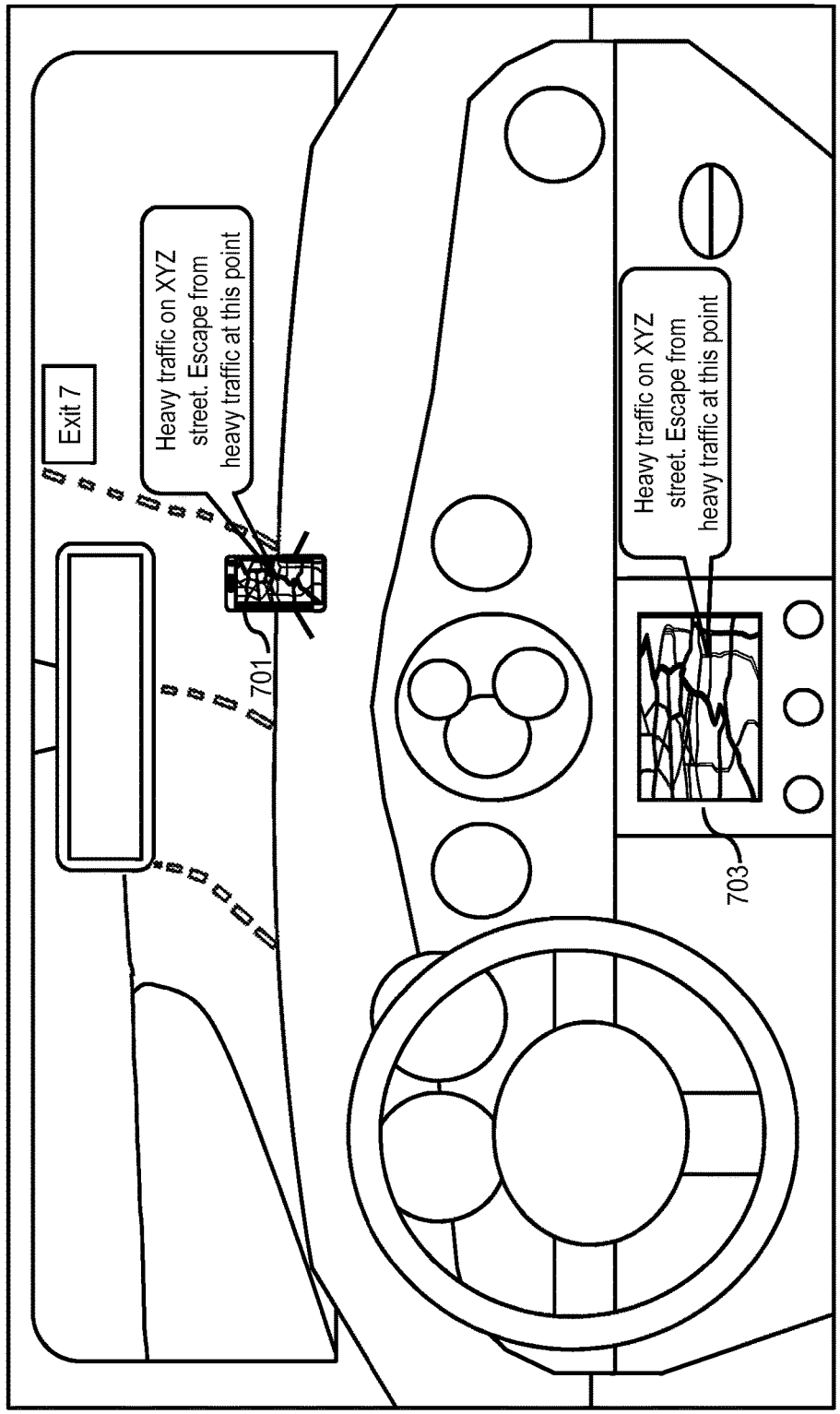
FIG. 7 is a diagram utilized in the process of notifying at least one user regarding at least one escape point at a particular time period, according to one example embodiment.

FIG. 7 is a diagram utilized in the process of notifying at least one user regarding at least one escape point at a particular time period, according to one example embodiment. In one scenario, user B is driving towards a route segment with heavy traffic density. The computation platform 109 may calculate at least one escape point, and may cause a notification of the at least one escape point in the at least one mobile device 701 and/or the at least one device 703 associated with the at least one vehicle based, at least in part, on proximity of the device to the escape point. In one example embodiment, the mobile device 701 and/or the device 703 may notify users on route segments where heavy traffic is to be expected (e.g., heavy traffic on XYZ street).

Accordingly, the user understands that he/she has to take an alternative route to escape from the heavy traffic on XYZ street. The computation platform 109 may optionally suggest corresponding maneuvers (e.g., take next exit). In one embodiment, one or more notifications may be a textual notification and/or an audio notification and/or a video notification.

The processes described herein for determining an escape point for at least one predicted route, and causing a timely notification based on attributes associated with the escape point may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
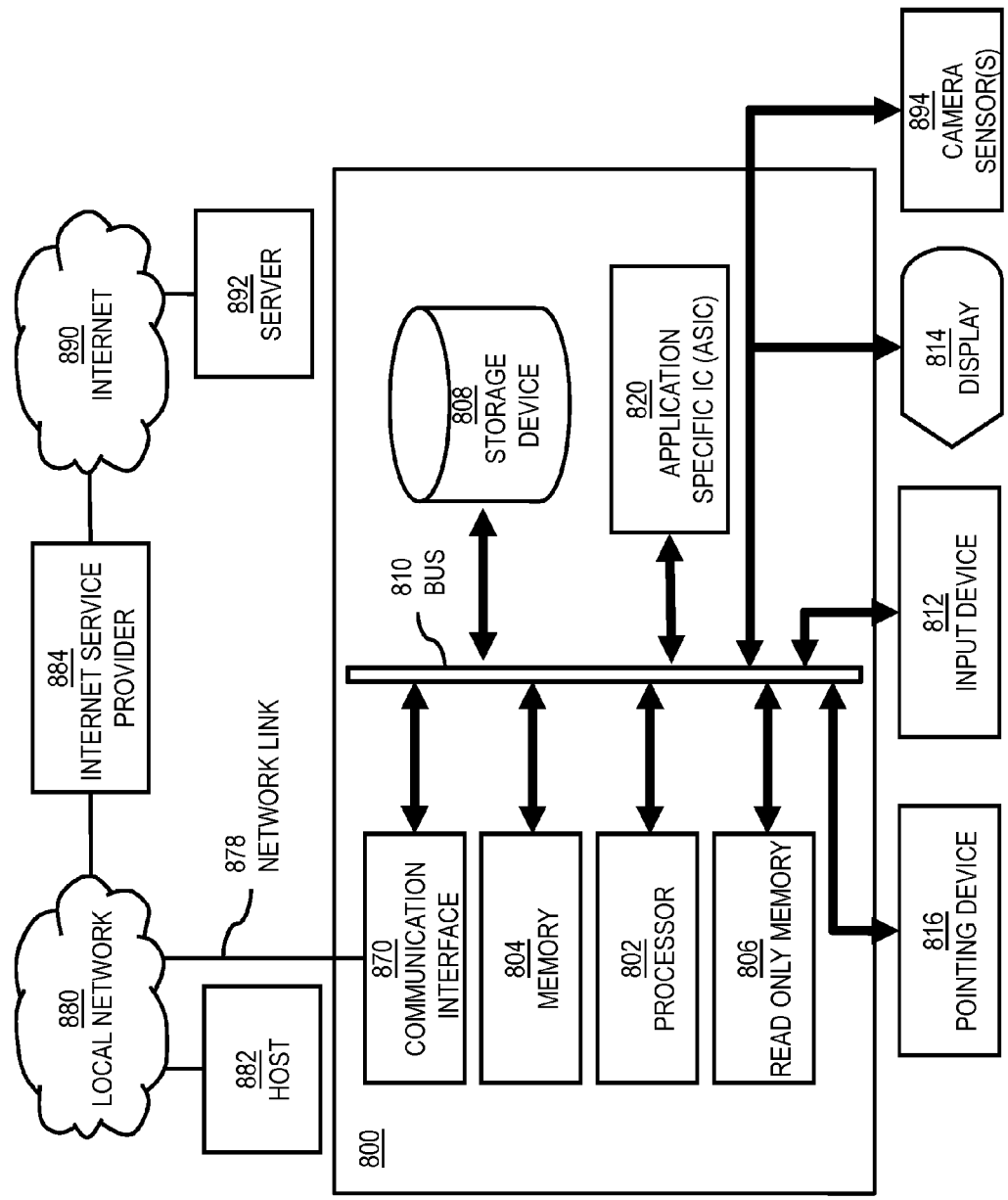
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to determine an escape point for at least one predicted route, and cause a timely notification based on attributes associated with the escape point as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of determining an escape point for at least one predicted route, and causing a timely notification based on attributes associated with the escape point.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to determining an escape point for at least one predicted route, and causing a timely notification based on attributes associated with the escape point. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 800 also includes a memory 804 coupled to bus 810. The memory 804, such as a random access memory (RAM) or any other dynamic storage device, stores information including processor instructions for determining an escape point for at least one predicted route, and causing a timely notification based on attributes associated with the escape point. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for determining an escape point for at least one predicted route, and causing a timely notification based on attributes associated with the escape point, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 894 for capturing, recording and causing to store one or more still and/or moving images (e.g., videos, movies, etc.) which also may comprise audio recordings. In some embodiments, for example, in embodiments in which the computer system 800 performs all functions automatically without human input, one or more of external input device 812, display device 814 and pointing device 816 may be omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 107 for determining an escape point for at least one predicted route, and causing a timely notification based on attributes associated with the escape point to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to determine an escape point for at least one predicted route, and cause a timely notification based on attributes associated with the escape point as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of determining an escape point for at least one predicted route, and causing a timely notification based on attributes associated with the escape point.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to determine an escape point for at least one predicted route, and cause a timely notification based on attributes associated with the escape point. The memory 905 also stores the data associated with or generated by the execution of the inventive steps.

Figure 10:
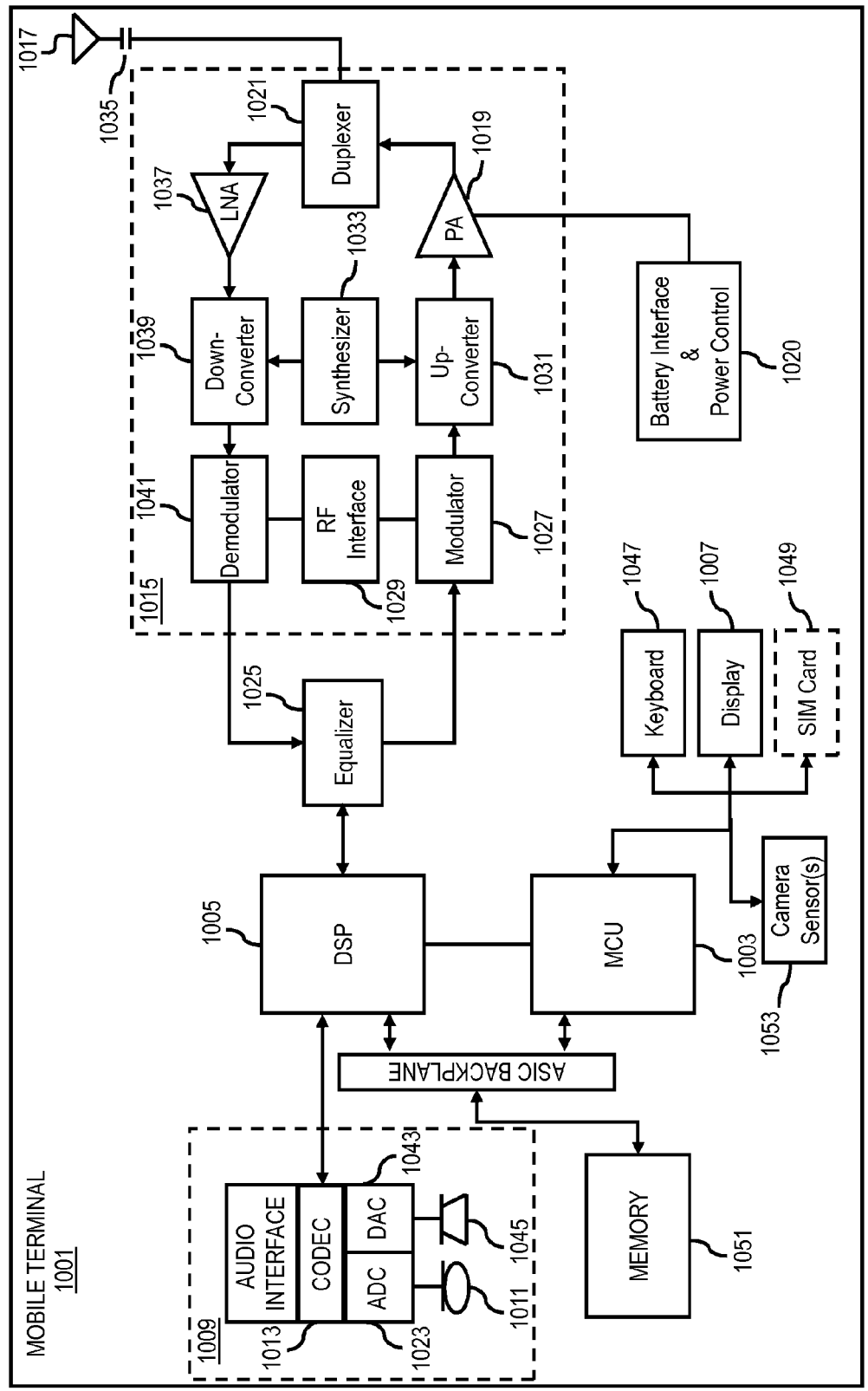
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1A, according to one embodiment. In some embodiments, mobile terminal 1001, or a portion thereof, constitutes a means for performing one or more steps of determining an escape point for at least one predicted route, and causing a timely notification based on attributes associated with the escape point. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of determining an escape point for at least one predicted route, and causing a timely notification based on attributes associated with the escape point. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to determine an escape point for at least one predicted route, and cause a timely notification based on attributes associated with the escape point. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

Further, one or more camera sensors 1053 may be incorporated onto the mobile station 1001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   when a vehicle starts moving, determining, by an apparatus, at least one predicted route for the vehicle based, at least in part, on current location data of the vehicle and a predictive model created for the vehicle without user indication of a destination of the vehicle, wherein the current location data is received from one or more global positioning system sensors that are embedded in the vehicle, in a user device inside the vehicle, or a combination thereof;
   determining, by the apparatus, one or more traffic events associated with the at least one predicted route;
   determining, by the apparatus, at least one escape point for the one or more traffic events, wherein the at least one escape point represents at least one location at which the one or more traffic events can be avoided via at least one detour route; and
   initiating, by the apparatus, a presentation on a user interface of the user device of one or more notifications related to the at least one escape point, the one or more traffic events, or a combination thereof based, at least in part, on characteristic information, availability information, or a combination thereof associated with the at least one escape point.

2. A method of claim 1, further comprising:
   initiating a hiding of information associated with the one or more traffic events based, at least in part, on determining that the availability information indicates that the at least one escape point is not available.

3. A method of claim 2, further comprising:
   determining that the at least one escape point is not available based, at least in part, on at least one maximum travel time duration difference threshold, at least one maximum travel distance difference threshold, or a combination thereof between the at least one predicted route and the at least one detour route,
   wherein the apparatus is embedded in a server communicating with the vehicle via a network.

4. A method of claim 2, wherein the hiding of the information associated with the one or more traffic events is with respect to at least one mapping user interface, at least one navigation user interface, or a combination thereof, wherein the at least one predicted route includes a routine route of the vehicle.

5. A method of claim 1, wherein the presentation of the one or more notifications is initiated based, at least in part, on detecting that the vehicle is approaching the at least one escape point within at least one proximity threshold.

6. A method of claim 5, wherein the at least one proximity threshold specifies at least one latest point at which the one or more notifications to be used by the vehicle to avoid the one or more traffic event.

7. A method of claim 1, further comprising:
   creating the predictive model for the vehicle based, at least in part, on routes of at least one road network travelled by the vehicle and respective time information;
   determining current or predicted traffic information for one or more segments of the at least one predicted route based, at least in part, on the predictive model;
   initiating a comparison of the current or predicted traffic information against historical traffic information to determine one or more noticeable segments from among the one or more segments of the at least one predicted route; and determining the one or more traffic events based, at least in part, on the one or more noticeable segments.

8. A method of claim 7, wherein the comparison of the current or predicted traffic information against historical traffic information is based, at least in part, on at least one difference threshold value, wherein the predictive model is a probabilistic model of which route is to be travelled by the vehicle when and at what speed.

9. A method of claim 7, further comprising:

initiating a presentation of the current or predicted traffic information, the historical traffic information, or a combination thereof associated with the one or more noticeable segments, wherein the apparatus is embedded in the user device that is embedded within or communicatively connected to the vehicle.

10. A method of claim 1, further comprising:

as the vehicle passing an intersection of the at least one road network, updating the at least one predicted route in real time based, at least in part, on a road segment just travelled by the vehicle and the predictive model.

11. An apparatus comprising:

at least one processor; and at least one memory including computer program code for one or more programs, the at least one memory and the computer program code configured to, with the at least one processor, cause the apparatus to perform at least the following, when a vehicle starts moving, determine at least one predicted route for the vehicle based, at least in part, on current location data of the vehicle and a predictive model created for the vehicle without user indication of a destination of the vehicle, wherein the current location data is received from one or moreglobal positioning system sensors that are embedded in the vehicle, in a user device inside the vehicle, or a combination thereof;

determine one or more traffic events associated with the at least one predicted route;

determine at least one escape point for the one or more traffic events, wherein the at least one escape point represents at least one location at which the one or more traffic events can be avoided via at least one detour route; and initiate a presentation on a user interface of the user device of one or more notifications related to the at least one escape point, the one or more traffic events, or a combination thereof based, at least in part, on characteristic information, availability information, or a combination thereof associated with the at least one escape point.

12. An apparatus of claim 11, wherein the apparatus is further caused to:

initiate a hiding of information associated with the one or more traffic events based, at least in part, on determining that the availability information indicates that the at least one escape point is not available.

13. An apparatus of claim 12, wherein the apparatus is further caused to:

determine that the at least one escape point is not available based, at least in part, on at least one maximum travel time duration difference threshold, at least one maximum travel distance difference threshold, or a combination thereof between the at least one predicted route and the at least one detour route.

14. An apparatus of claim 12, wherein the hiding of the information associated with the one or more traffic events is with respect to at least one mapping user interface, at least one navigation user interface, or a combination thereof.

15. An apparatus of claim 11, wherein the presentation of the one or more notifications is initiated based, at least in part, on detecting that the vehicle is approaching the at least one escape point within at least one proximity threshold.

16. An apparatus of claim 15, wherein the at least one proximity threshold specifies at least one latest point at which the one or more notifications to be used by the vehicle to avoid the one or more traffic event.

17. An apparatus of claim 11, wherein the apparatus is further caused to:

create the predictive model for the vehicle based, at least in part, on routes of at least one road network travelled by the vehicle and respective time information;

determine current or predicted traffic information for one or more segments of the at least one predicted route based, at least in part, on the predictive model;

initiate a comparison of the current or predicted traffic information against historical traffic information to determine one or more noticeable segments from among the one or more segments of the at least one predicted route; and determine the one or more traffic events based, at least in part, on the one or more noticeable segments.

18. A non-transitory computer-readable storage medium carrying one or more sequences of one or more instructions which, when executed by one or more processors, cause an apparatus to at least perform the following steps:

when a vehicle starts moving, determining at least one predicted route for the vehicle based, at least in part, on current location data of the vehicle and a predictive model created for the vehicle without user indication of a destination of the vehicle, wherein the current location data is received from one or more global positioning system sensors that are embedded in the vehicle, in a user device inside the vehicle, or a combination thereof;

determining one or more traffic events associated with the at least one predicted route;

determining at least one escape point for the one or more traffic events, wherein the at least one escape point represents at least one location at which the one or more traffic events can be avoided via at least one detour route; and initiating a presentation on a user interface of the user device of one or more notifications related to the at least one escape point, the one or more traffic events, or a combination thereof based, at least in part, on characteristic information, availability information, or a combination thereof associated with the at least one escape point.

19. A non-transitory computer-readable storage medium of claim 18, wherein the apparatus is further caused to:

initiating a hiding of information associated with the one or more traffic events based, at least in part, on determining that the availability information indicates that the at least one escape point is not available.

20. A non-transitory computer-readable storage medium of claim 19, wherein the apparatus is further caused to:

determining that the at least one escape point is not available based, at least in part, on at least one maximum travel time duration difference threshold, at least one maximum travel distance difference threshold, or a combination thereof between the at least one predicted route and the at least one detour route.

* * * * *